United States Patent
Wariishi et al.

(10) Patent No.: US 6,926,985 B2
(45) Date of Patent: Aug. 9, 2005

(54) FUEL CELL STACK

(75) Inventors: Yoshinori Wariishi, Utsunomiya (JP); Hideaki Kikuchi, Kawachi-gun (JP); Masaharu Suzuki, Utsunomiya (JP); Masaru Oda, Utsunomiya (JP); Yosuke Fujii, Kawachi-gun (JP); Ichiro Baba, Utsunomiya (JP)

(73) Assignee: Honda Giken Kabushiki Kaisha, Tokyo (JP)

( * ) Notice: Subject to any disclaimer, the term of this patent is extended or adjusted under 35 U.S.C. 154(b) by 26 days.

(21) Appl. No.: 10/400,340

(22) Filed: Mar. 26, 2003

(65) Prior Publication Data

US 2003/0194591 A1 Oct. 16, 2003

(30) Foreign Application Priority Data

Mar. 26, 2002 (JP) ........................................ 2002-085744

(51) Int. Cl.[7] ............................. H01M 8/04; H01M 8/24
(52) U.S. Cl. ............................. 429/32; 429/26; 429/38; 429/39
(58) Field of Search ............................. 429/32, 39, 26, 429/38

(56) References Cited

U.S. PATENT DOCUMENTS

| RE36,148 E | 3/1999 | Strasser | 429/13 |
|---|---|---|---|
| 6,294,278 B1 | 9/2001 | Wohr et al. | 429/24 |
| 2002/0146612 A1 * | 10/2002 | Sugiura et al. | 429/32 |
| 2003/0054224 A1 * | 3/2003 | Wariishi et al. | 429/38 |
| 2004/0161649 A1 * | 8/2004 | Wariishi et al. | 429/32 |

FOREIGN PATENT DOCUMENTS

| JP | 6-260206 | 9/1994 |
|---|---|---|
| JP | 11-312531 | 11/1999 |

* cited by examiner

*Primary Examiner*—John S. Maples
(74) *Attorney, Agent, or Firm*—Lahive & Cockfield, LLP; Anthony A. Laurentano, Esq

(57) ABSTRACT

A fuel gas passage, an oxygen-containing gas passage, and a coolant passage extend through a fuel cell stack. Each of the fuel gas passage and the oxygen-containing gas passage is formed by serially connecting passages between the first through third fuel cell modules. The fuel gas flows through the fuel gas passage, and the oxygen-containing gas flows through the oxygen-containing gas passage from the first fuel cell module toward the third fuel cell module. The coolant passage is formed by serially connecting passages between the first through third fuel modules. The coolant flows through the coolant passage from the third fuel cell module toward the first fuel cell module. The direction of the flow of the coolant is opposite to the direction of the flows of the fuel gas and the oxygen-containing gas.

5 Claims, 8 Drawing Sheets

PRIOR ART

FUEL CELL STACK

BACKGROUND OF THE INVENTION

1. Field of the Invention

The present invention relates to a fuel cell stack formed by connecting a plurality of fuel cell modules together. Each of the fuel cell modules includes units of fuel cells, i.e., the fuel cell module is formed by stacking a plurality of membrane electrode assemblies and separators alternately. The Each of the membrane electrode assemblies includes an anode, a cathode, and an electrolyte membrane interposed between the anode and the cathode.

2. Description of the Related Art

For example, a solid polymer electrolyte fuel cell employs a membrane electrode assembly (MEA) which includes two electrodes (anode and cathode) and an electrolyte membrane interposed between the electrodes. The electrolyte membrane is a polymer ion exchange membrane (proton exchange membrane). Each of the electrodes comprises a catalyst and a porous carbon sheet. The membrane electrode assembly is interposed between separators (bipolar plates). The membrane electrode assembly and the separators make up a unit of the fuel cell (unit cell) for generating electricity. A plurality of unit cells are connected together to form a fuel cell stack.

In the fuel cell stack, a fuel gas such as a hydrogen-containing gas is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. An oxygen-containing gas or air is supplied to the cathode. At the cathode, the hydrogen ions from the anode combine with the electrons and oxygen to produce water.

The fuel cell stack is mounted in a vehicle, for example. In the vehicle application, a relatively high power output is required. Therefore, at the time of starting the operation of the fuel cell stack, the fuel cell stack needs to be heated swiftly so that the fuel cell stack output the high power desirably.

For example, a fuel cell device is disclosed in U.S. Pat. No. 6,294,278 B1. As shown in FIG. 8, the fuel cell device has a high temperature stack 1 and a low temperature stack 2. A plurality of fuel cells 3a are stacked together to form the high temperature stack 1. A plurality of fuel cells 3b are stacked together to form the low temperature stack 2. The fuel cells 3a of the high temperature stack 1 and the fuel cells 3b of the low temperature stack 2 are operated at different temperatures.

The inlet side of the high temperature stack 1 is connected to a fuel gas supply passage 4 for supplying a fuel gas (reactant gas) to a fuel gas passage (not shown) in the high temperature stack 1, and an oxygen-containing gas supply passage 5 for supplying an oxygen-containing gas (reactant gas) to a oxygen-containing gas passage (not shown) in the high temperature stack 1. Further, the outlet side of the high temperature stack 1 is connected to connection lines 6a, 6b. The reactant gases are discharged from the outlet side of the high temperature stack 1 into the connection lines 6a, 6b. The connection lines 6a, 6b are connected to a fuel gas passage (not shown) and an oxygen-containing gas passage (not shown) in the low temperature stack 2 through a cooler 7.

The high temperature stack 1 and the low temperature stack 2 are cooled by a cooling air flowing in a direction indicated by an arrow H which is perpendicular to a direction indicated by an arrow L. The cooling air firstly cools the low temperature stack 1, and then, cools the high temperature stack 2.

In the conventional fuel cell device, the connection lines 6a, 6b for supplying the fuel gas and the oxygen-containing gas from the high temperature stack 1 to the low temperature stack 2, and the cooler 7 for cooling the fuel gas and the oxygen-containing gas to the desirable operating temperature of the low temperature stack 2 are required. Therefore, the fuel cell device is not simple, and economical.

In the high temperature stack 1 and the low temperature stack 2, the fuel cells 3a, 3b are stacked in the direction indicated by the arrow L, and the cooling air flows in the direction indicated by the arrow H. Therefore, the temperature in the high temperature stack 1 varies in the stacking direction indicated by the arrow L. In other words, in the high temperature stack 1, the reactant gas passages (the fuel gas passage and the oxygen-containing gas passage) have a low temperature on the inlet side, and has a high temperature on the outlet side.

Therefore, the relative humidity in the fuel cells 3a positioned on the outlet side is low, and the overall power generation performance of the high temperature stack 1 is low. In particular, when many fuel cells 3a are stacked in a vehicle application, the power generation performance of the fuel cells 3a positioned on the outlet side is considerably low. The low temperature stack 2 has a similar problem as the high temperature stack 1.

SUMMARY OF THE INVENTION

A main object of the present invention is to provide a fuel cell stack having a simple structure in which the power generation performance is uniform in each of fuel cells stacked to form the fuel cell stack, and the power generation performance of the overall fuel cell stack is maintained desirably.

According to the present invention, a fuel cell stack comprises a plurality of fuel cell modules connected together. Each of the fuel cell modules is formed by stacking a plurality of membrane electrode assemblies in a stacking direction. Each of the membrane electrode assemblies includes an anode, a cathode, and a membrane electrode assembly interposed between the anode and the cathode. At least one reactant gas passage and a coolant passage extend through the fuel cell modules such that the reactant gas such as a fuel gas or an oxygen-containing gas flows in the reactant gas passage and the coolant flows in said coolant passage in opposite directions with respect to the stacking direction. The reactant gas passage includes a reactant gas inlet and a reactant gas outlet in each of the fuel cell modules such that the reactant gas flowing out of said reactant gas outlet of one of said fuel cell modules flows into the reactant gas inlet of the next fuel cell module of the fuel cell modules. The coolant passage includes a coolant inlet and a coolant outlet in each of the fuel cell modules such that the coolant flowing out of the coolant outlet of one of the fuel cell modules flows into the coolant inlet of the next fuel cell module of the fuel cell modules.

When a plurality of fuel cell modules (the number of the fuel cell modules=N) are stacked to form the fuel cell stack, the reactant gas flows in the stacking direction from the first fuel cell module toward the Nth fuel cell module, the coolant flows from the Nth fuel cell module toward the first fuel cell.

The coolant firstly cools the Nth fuel cell module, after cooling other fuel cell modules successively, the coolant lastly cools the first fuel cell module. Thus, the temperature in the first fuel cell module is high, and the temperature in the Nth fuel cell module is low. The relative humidity in the fuel cell modules on the downstream side is high.

In the fuel cell modules on the downstream side, the relative humidity does not decrease due to the rise of temperature. Therefore, the power generation performance of the overall fuel cell stack is maintained desirably.

With the minor modification in the structure, the direction of the flow of the coolant is opposite to the direction of the flows of the fuel gas and the oxygen-containing gas at least between two fuel cell modules with respect to the stacking direction. Therefore, the fuel cell stack can be produced economically.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
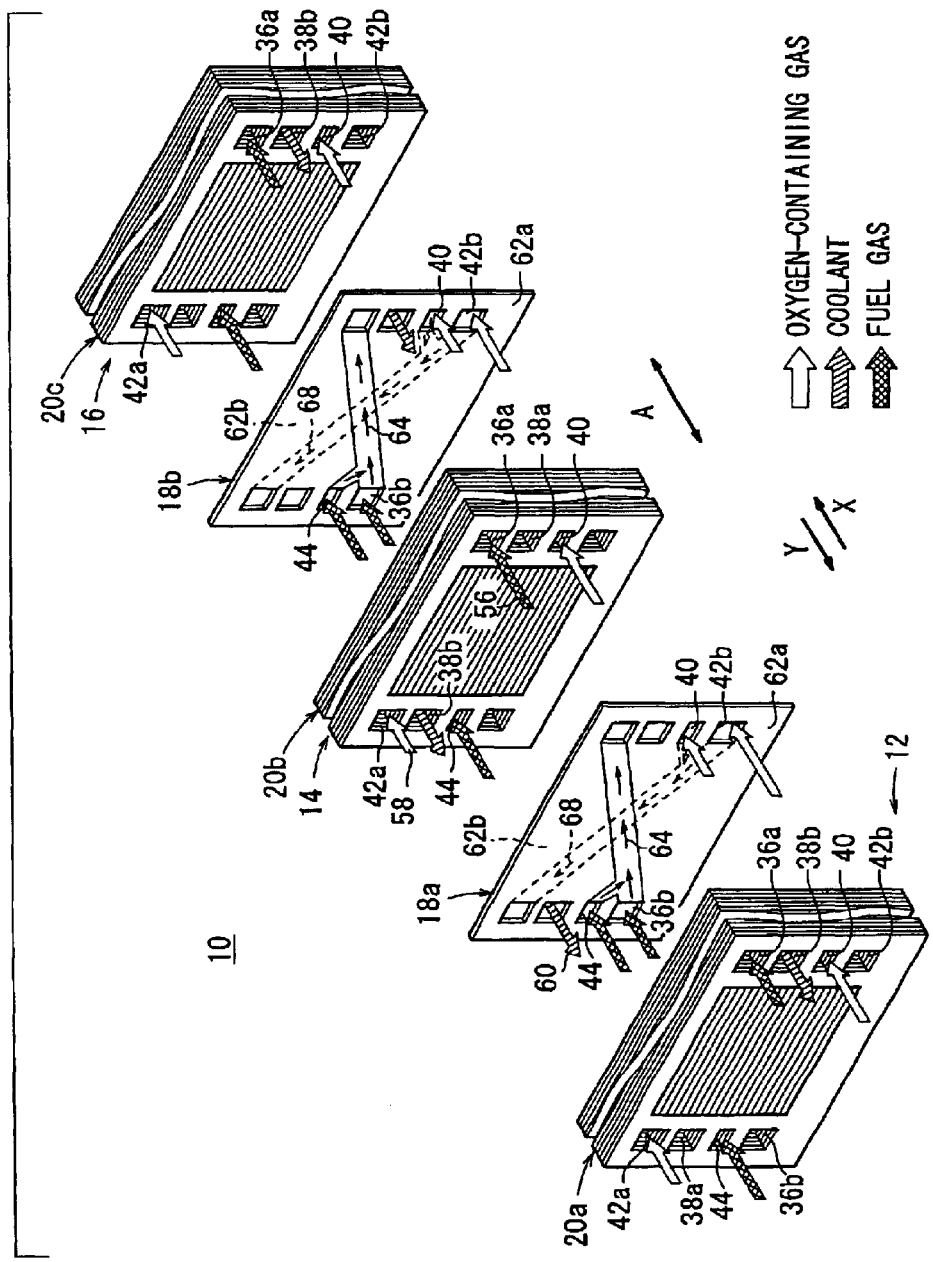
FIG. 1 is a schematic perspective view schematically showing a fuel cell stack according to an embodiment of the present invention.

FIG. 1 is an exploded view schematically showing a fuel cell stack 10 according to an embodiment of the present invention.

The fuel cell stack 10 includes a first fuel cell module 12, a second fuel cell module 14, and a third fuel cell module 16 aligned in a direction indicated by an arrow X. Reactant gases such as an oxygen gas and a fuel gas are supplied in the direction indicated by the arrow X. An intermediate plate 18a is interposed between the first fuel cell module 12 and the second fuel cell module 14. An intermediate plate 18b is interposed between the second fuel cell module 14 and the third fuel cell module 16.

Figure 2:
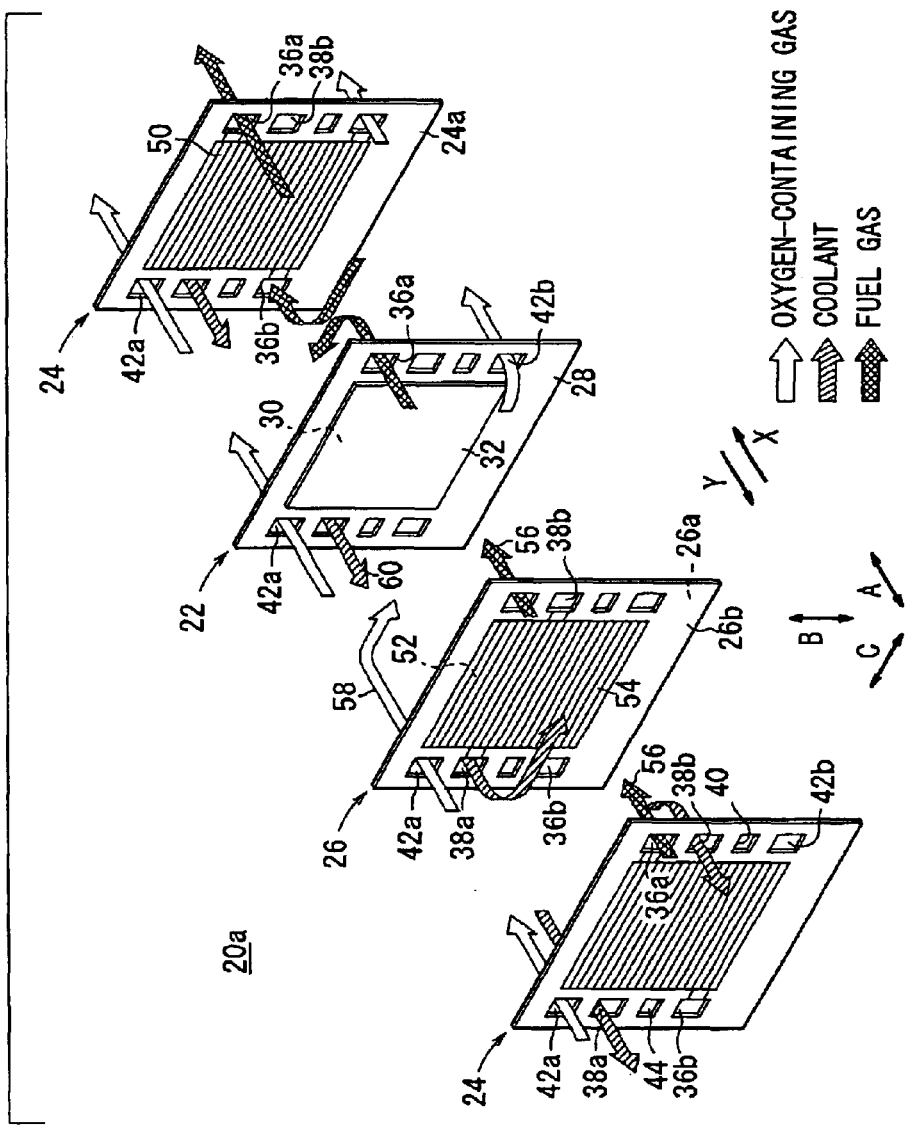
FIG. 2 is an exploded view showing a part of the fuel cell stack.

The first fuel cell module 12, the second fuel cell module 14, and the third fuel cell module 16 have substantially the same structure. Each of the first through third fuel cell modules 12, 14, 16 includes a certain number of unit cells 20a, 20b, 20c stacked in a direction indicated by an arrow A. As shown in FIG. 2, the unit cell 20a includes a first separator 24, a second separator 26, and a membrane electrode assembly 22 interposed between the first separator 24 and the second separator 26.

The membrane electrode assembly 22 includes an anode 30, a cathode 32, and an ion exchange membrane 28 of a solid electrolyte interposed between the anode 30 and the cathode 32. Each of the anode 30 and the cathode 32 comprises a porous carbon sheet and a catalyst facing the ion exchange membrane 28.

The anode 30 of the membrane electrode assembly 22 faces the first separator 24, and the cathode 32 of the membrane electrode assembly 22 faces the second separator 26. Each of the first separator 24 and the second separator 26 is formed of a thin metal conductive plate or a carbon plate.

The components of the fuel cell units 20a have holes at one end in the longitudinal direction indicated by an arrow C. When the components of the fuel units 20a are stacked together in the stacking direction indicated by the arrow A, these holes form a fuel gas inlet 36a as a passage of a fuel gas such as a hydrogen-containing gas (reactant gas), a coolant outlet 38b as a passage of a coolant, a low humidity oxygen-containing gas inlet 40, and an oxygen-containing gas outlet 42b as a passage of an oxygen-containing gas (reactant gas).

Further, the components of the fuel cell units 20a have holes at the other end in the longitudinal direction indicated by the arrow C. When the components of the fuel units 20a are stacked together in the stacking direction indicated by the arrow A, these holes form an oxygen-containing gas inlet 42a, a coolant inlet 38a, and a low-humidity fuel gas inlet 44, and a fuel gas outlet 36b.

The humidity of the oxygen containing gas supplied to the low humidity oxygen-containing gas inlet 40 is lower than the humidity of the oxygen-containing gas supplied to the oxygen-containing gas inlet 42a. The humidity of the fuel gas supplied to the low humidity fuel gas inlet 44 is lower than the humidity of the fuel gas supplied to the fuel gas inlet 36a.

The first separator 24 has fuel gas grooves 50 on its surface 24a facing the membrane electrode assembly 22. The fuel gas grooves 50 are connected to the fuel gas inlet 36a at one end, and connected to the fuel gas outlet 36b at the other end. The fuel gas grooves 50 extend in the direction indicted by the arrow C.

Figure 3:
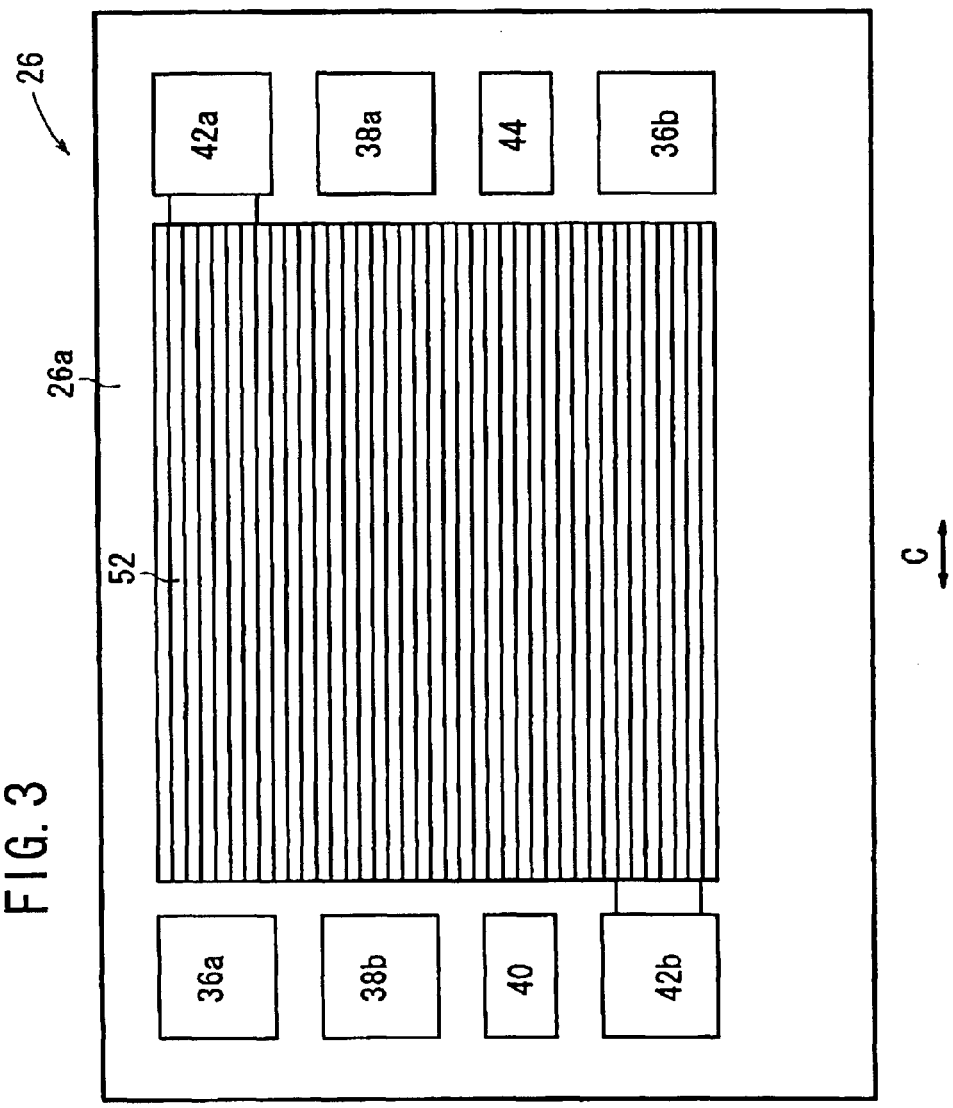
FIG. 3 is a front view showing a first separator of a unit cell of the fuel cell stack.

As shown in FIG. 3, the second separator 26 has oxygen-containing gas grooves 52 on its surface 26a facing the membrane electrode assembly 22. The oxygen-containing gas grooves 52 are connected to the oxygen-containing gas inlet 42a at one end, and connected to the oxygen-containing gas outlet 42b at the other end. The oxygen-containing gas grooves 52 extend in the direction indicated by the arrow C.

As shown in FIG. 2, the second separator 26 has coolant grooves 54 on a surface 26b. The coolant grooves 54 are connected to the coolant inlet 38a at one end, and connected to the coolant outlet 38b at the other end. The coolant grooves 54 extend in the direction indicated by the arrow C.

As shown in FIG. 2, the unit cell 20a has the fuel gas passage (reactant gas passage) 56 formed by the fuel gas inlet 36a, the fuel gas grooves 50, and the fuel gas outlet 36b. The unit cell 20a also has the oxygen-containing gas passage (reactant gas passage) 58 formed by the oxygen-containing gas inlet 42a, the oxygen-containing gas grooves 52, and the oxygen-containing gas outlet 42b. Further, the unit cell 20a has the coolant passage 60 formed by the coolant inlet 38a, the coolant grooves 54, and the coolant outlet 38b.

The fuel gas in the fuel gas passage 56 and the oxygen-containing gas in the oxygen-containing gas passage 58 flow in the direction indicted by the arrow X. The coolant in the coolant passage 60 flows in the opposite direction indicated by an arrow Y.

Figure 4:
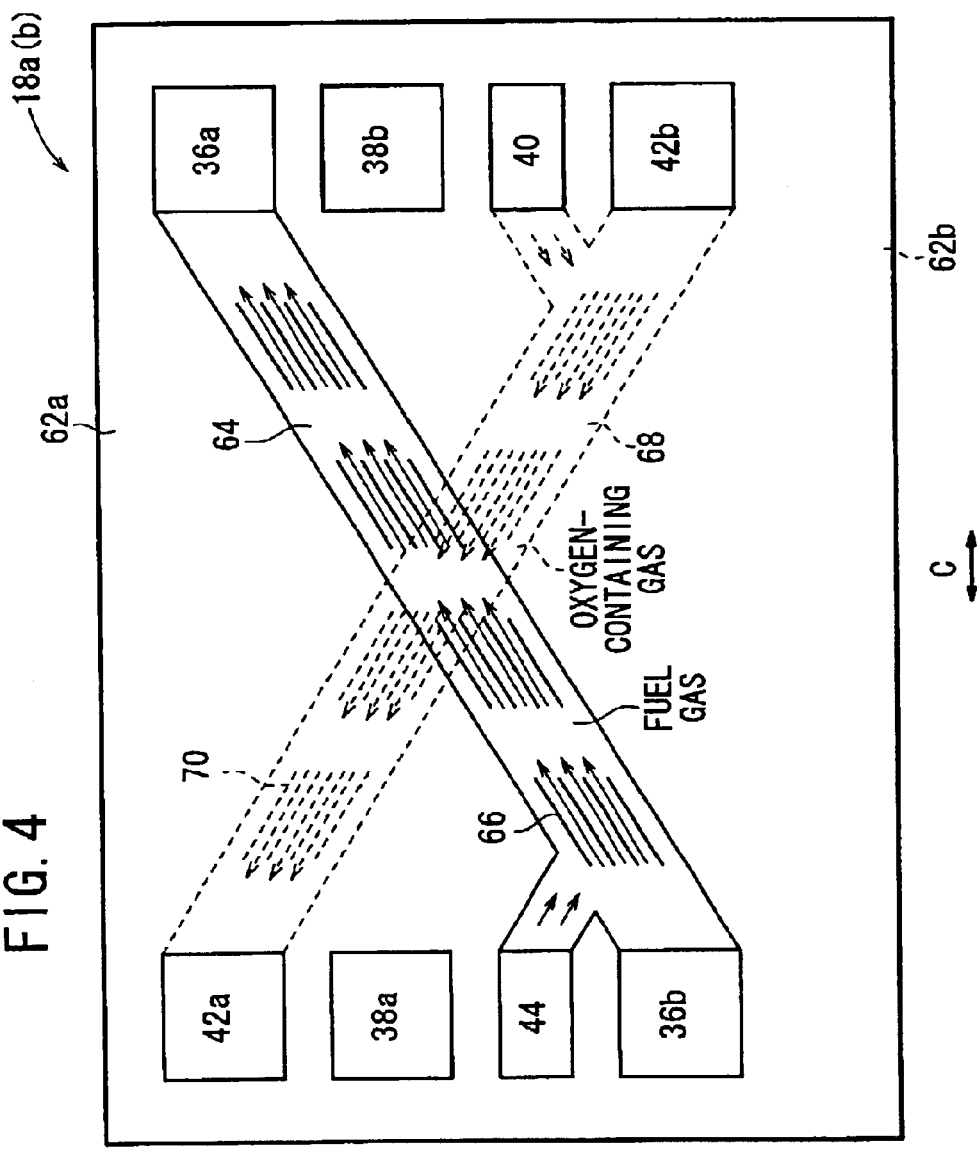
FIG. 4 is a front view showing an intermediate plate of the fuel cell stack.

As shown in FIGS. 1 and 4, a fuel gas mixing passage 64 is provided on a surface 62a of the intermediate plate 18a (18b). The fuel gas mixing passage 64 is connected to the fuel gas outlet 36b, the low humidity fuel gas inlet 44, and the fuel gas inlet 36a. The fuel gas mixing passage 64 is a long passage extending diagonally along the surface 62a, and guides 66 are provided in the fuel gas mixing passage 64.

Further, an oxygen-containing gas mixing passage 68 is provided on the other surface 62b of the intermediate plate 18a (18b). The oxygen-containing gas mixing passage 68 is connected to the oxygen-containing gas outlet 42b, the low humidity oxygen-containing gas inlet 40, and the oxygen-containing gas inlet 42a. The oxygen-containing gas mixing passage 68 extends diagonally along the surface 62b in crossing relationship to the fuel gas mixing passage 64 extending along the surface 62a. Guides 70 are provided in the oxygen-containing gas mixing passage 68.

As shown in FIG. 1, the first through third fuel cell modules 12, 14, 16 have substantially the same structure. However, the positions of the coolant inlet 38a and the coolant outlet 38b of the second fuel cell module 14 are opposite to those of the first fuel cell module 12 and the third fuel cell module 16.

In the fuel cell stack 10, the passages forming the fuel gas passage 56 are connected in series between the first through third fuel cell modules 12, 14, 16, and the passages forming the oxygen-containing gas passage 58 are connected in series between the first through third fuel cell modules 12, 14, 16. The fuel gas and the oxygen-containing gas flow from the first fuel cell module 12 toward the third fuel cell module 16 in the direction indicated by the arrow X. In another embodiment, the passages forming the fuel gas passage 56 are connected in series between the first through third fuel cell modules 12, 14, 16, and the passages forming the oxygen-containing gas passage 58 are connected in parallel between the first through third fuel cell modules 12, 14, 16.

Passages forming the coolant passage 60 are connected in series between the first through third fuel cell modules 12, 14, 16. The coolant flows from the third fuel cell module 16 toward the first fuel cell module 12 in the direction indicated by the arrow Y.

Next, an operation of the fuel cell stack 10 according to an embodiment of the present invention will be described.

As shown in FIG. 1, an oxygen-containing gas such as air is supplied to the oxygen-containing gas passage 58, and a fuel gas such as a hydrogen-containing gas is supplied to the fuel gas passage 56. Further, a coolant such as pure water, an ethylene glycol or an oil is supplied to the coolant passage 60. The air and the hydrogen-containing gas flow from the first fuel cell module 12 in the direction indicated by the arrow X. The coolant flows from the third fuel cell module 16 in the direction indicated by the arrow Y. Further, an additional fuel gas having a low humidity is supplied to the low humidity fuel gas inlet 44, and an additional oxygen-containing gas having a low humidity is supplied to the low humidity oxygen-containing gas inlet 40.

Thus, the fuel gas, the oxygen-containing gas, and the coolant are supplied to the unit cells 20a stacked in the direction indicated by the arrow A to form the first fuel cell module 12. As shown in FIG. 2, the oxygen-containing gas supplied to the oxygen-containing gas inlet 42a extending in the direction indicated by the arrow A flows into the oxygen-containing gas grooves 52 of the second separator 26, and flows along the cathode 32 of the membrane electrode assembly 22 to induce an electrochemical reaction at the cathode 32. The fuel gas supplied to the fuel gas inlet 36a flows into the fuel gas grooves 50 of the first separator 24, and flows along the anode 30 of the membrane electrode assembly 22 to induce an electrochemical reaction at the anode 30.

In the membrane electrode assembly 22, the oxygen-containing gas supplied to the cathode 32, and the fuel gas supplied to the anode 30 are consumed in the electrochemical reactions at catalyst layers of the cathode 32 and the anode 30 for generating electricity.

The coolant supplied to the coolant inlet 38a flows through the coolant grooves 54 of the second separator 26. After the coolant cools the membrane electrode assembly 22, the coolant flows through the coolant outlet 38b.

As described above, the oxygen-containing gas and the fuel gas consumed in the unit cells 20a flow through the oxygen-containing gas outlet 42b, and the fuel gas outlet 36b, respectively, and supplied downstream of the first fuel cell module 12 to the intermediate plate 18a. As shown in FIGS. 1 and 4, the consumed fuel gas (low concentration fuel gas) from the fuel gas outlet 36b and the additional fuel gas (low humidity fuel gas) from the low humidity fuel gas inlet 44 are supplied to the fuel gas mixing passage 64 on the surface 62a of the intermediate plate 18a.

Thus, the low concentration fuel gas and the additional fuel gas (low humidity fuel gas) are mixed uniformly in the fuel gas mixing passage 64, and supplied to the fuel gas inlet 36a of the second fuel cell module 14.

The consumed oxygen-containing gas (high humidity oxygen-containing gas) containing water generated in the electrochemical reaction from the oxygen-containing gas outlet 42b and the additional oxygen-containing gas (low humidity oxygen-containing gas) from the low humidity oxygen-containing gas inlet 40 are supplied to the oxygen-containing gas mixing passage 68 on the other surface 62b of the intermediate plate 18a. In the same manner as the fuel gas mixing passage 64, the high humidity oxygen-containing gas and the additional oxygen-containing gas (low humidity oxygen-containing gas) are mixed uniformly, and supplied to the oxygen-containing gas inlet 42a of the second fuel cell module 14.

In the same manner as the first fuel cell module 12, in the second fuel cell module 14, the fuel gas supplied to the fuel gas inlet 36a flows along the anode 30 of the membrane electrode assembly 22, and the oxygen-containing gas supplied to the oxygen-containing gas inlet 42a flows along the cathode 32. Thus, the electricity is generated in the electrochemical reactions. The consumed oxygen-containing gas and the fuel gas are supplied to the intermediate plate 18b (see FIG. 1).

The consumed fuel gas and the consumed oxygen-containing gas are mixed with the additional fuel gas and an additional oxygen-containing gas, respectively on the intermediate plate 18b, and supplied to the fuel gas inlet 36a and the oxygen-containing gas inlet 42a. In the third fuel cell module 16, the fuel gas is supplied to the anode 30 of the membrane electrode assembly 22, and the oxygen-containing gas is supplied to the cathode 32 of the membrane electrode 30 for generating electricity.

The fuel gas and the oxygen-containing gas flow through the first fuel cell module 12, the second fuel cell module 14, and then, the third fuel cell module 16 in the direction indicated by the arrow X. The temperature of the second fuel cell module 14, and the third fuel cell module 16 positioned on the downstream side tends to be high. Therefore, the relative humidity tends to decrease, and the power generation performance in the unit cells 20b, 20c may not be desirable.

In the embodiment of the present invention, the passages forming the coolant passage 60 are connected in series between the first through third fuel cell modules 12, 14, 16. The coolant flows through the coolant passage 60 in the direction indicated by the arrow Y. The direction of the flow of the coolant is opposite to the direction of the flows of the fuel gas and the oxygen-containing gas.

Figure 5:
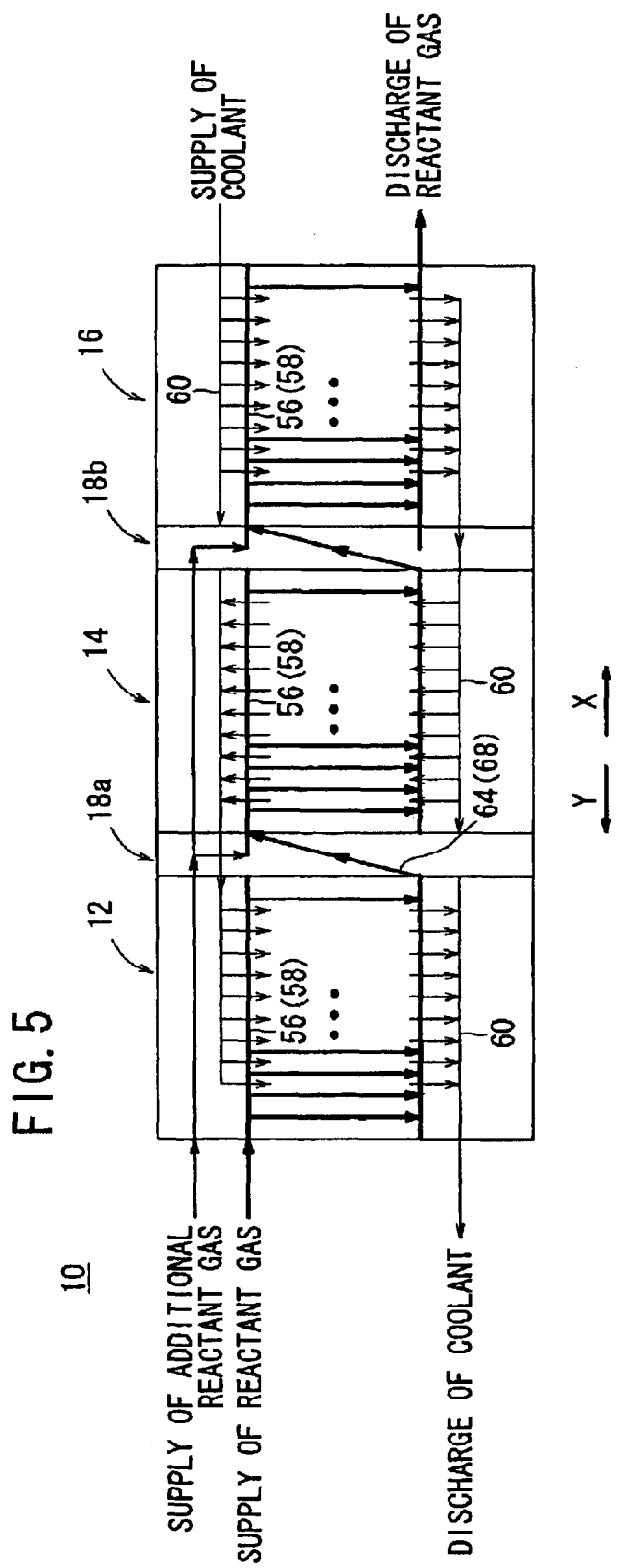
FIG. 5 is a view showing flows of gases in the fuel cell stack.
Figure 6:
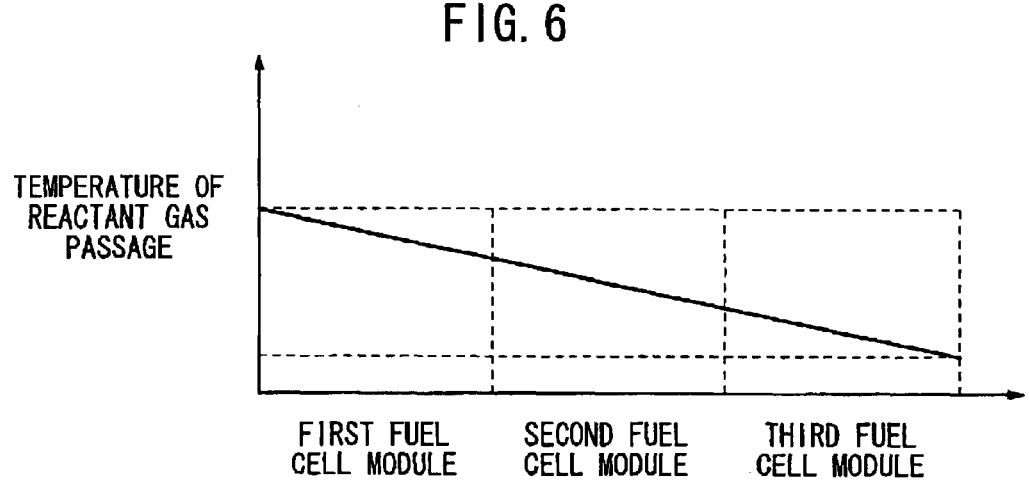
FIG. 6 is a view showing temperature distribution in first through third fuel cell modules of the fuel cell stack.

As shown in FIGS. 1 and 5, the coolant flows through the coolant passage 60 from the third fuel cell module 16 toward the first fuel cell module 12. Therefore, the coolant is firstly supplied to the third fuel cell module 16. After cooling the unit cells 20c of the third fuel cell module 16, the coolant is supplied to the second fuel cell module 14.

Figure 7:
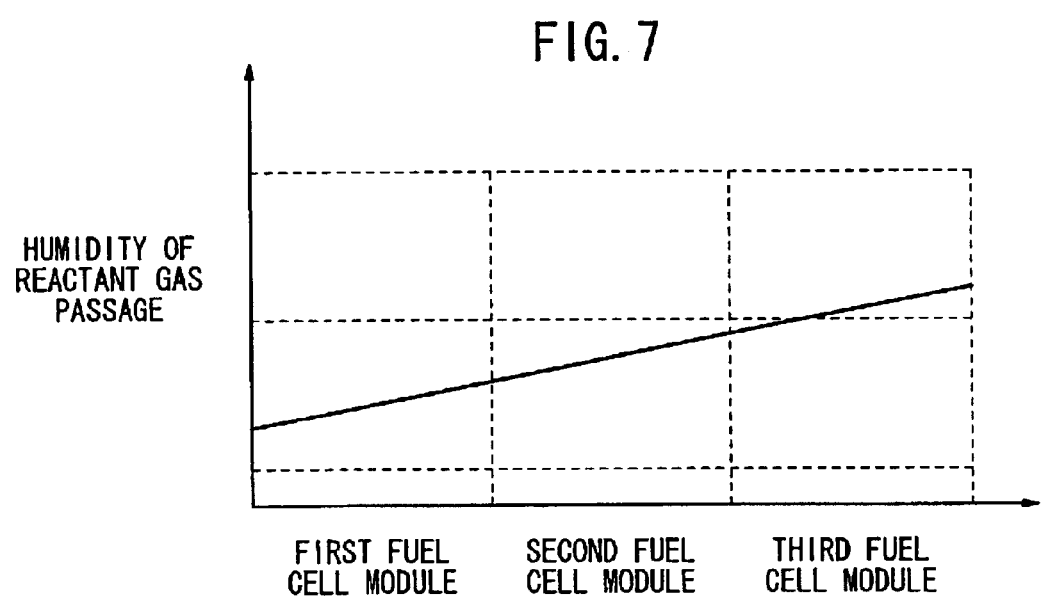
FIG. 7 is a view showing relative humidity in the first through third fuel cell modules.
Figure 8:
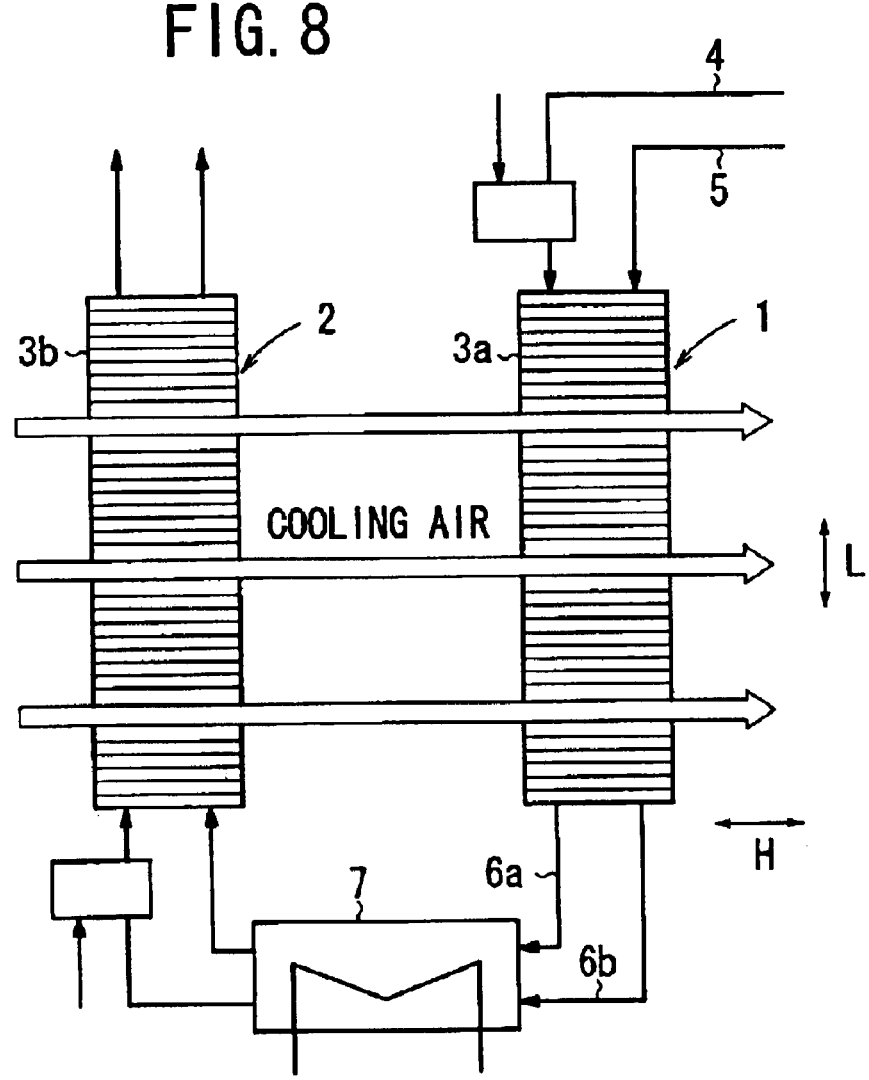
FIG. 8 is a view schematically showing a conventional fuel cell device.

In the second fuel cell module 14, the coolant cools the unit cells 20b, and the temperature of the coolant is increased. Therefore, the temperature of the first fuel cell module 12 is high, the temperature of the second fuel cell module 14 is moderate, and the temperature of the third fuel cell module 16 is low. The relative humidity is high in the second fuel cell module 14 and the third fuel cell module 16 (see FIG. 7).

Since the relative humidity in the second fuel cell module 14 and the third fuel cell module 16 does not decrease, and power generation performance in the unit cells 20b, 20c is improved. Therefore, the power generation performance of the overall fuel cell stack 10 is maintained desirably.

With the minor modification in the structure, the direction of the flow of the coolant is opposite to the direction of the flows of the fuel gas and the oxygen-containing gas. Therefore, the fuel cell stack 10 can be produced economically.

In the present embodiment, the fuel cell stack 10 is formed by the first through three fuel cell modules 12, 14, 16. The number of the fuel cell modules is not limited to three. Any number of the fuel cell modules may be used to form the fuel cell stack.

In the present embodiment, the long sides of the unit cells 20a, 20b, 20c are placed horizontally. Alternatively, the long sides of the unit cells 20a, 20b, 20c may be placed vertically.

According to the fuel cell stack of the present invention, passages forming the reactant gas passage are connected in series. Further, passages forming the coolant passage are connected in series. The reactant gas and the coolant flow in the opposite directions. Therefore, when the reactant flows from the fuel cell module on the upstream side to the fuel cell module on the downstream side, the temperature of the fuel cell module on the downstream side is lower than the fuel cell module on the upstream side. Therefore, the relative humidity of the fuel cell module on the downstream side is higher than the relative humidity of the fuel cell on the upstream side.

Since the relative humidity of the fuel cell module does not decrease on the downstream side, the power generation performance does not vary in the fuel cell stack, and the power generation performance of the overall fuel cell stack is maintained desirably. With the minor modification in the structure, the direction of the flow of the coolant is opposite to the direction of the flows of the fuel gas and the oxygen-containing gas, the fuel cell stack can be produced economically.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell stack comprising a plurality of fuel cell modules connected together with an intermediate plate interposed between an adjacent two of said fuel cell modules, said fuel cell modules each formed by stacking a plurality of membrane electrode assemblies and separators alternately in a stacking direction, said membrane electrode assemblies each including an anode, a cathode, and a membrane electrode assembly interposed between said anode and said cathode, wherein at least of one reactant gas passage and a coolant passage extend through said fuel cell modules such that said reactant gas flows in said reactant gas passage and said coolant flows in said coolant passage in opposite directions with respect to said stacking direction, said reactant gas passage includes a reactant gas inlet and a reactant gas outlet in each of said fuel cell modules, wherein said intermediate plate changes a flowing direction of said reactant gas such that said reactant gas flowing out of said reactant gas outlet of one of said fuel cell modules flows into said reactant gas inlet of the next fuel cell module of said fuel cell modules, and said coolant passage includes a coolant inlet and a coolant outlet in each of said fuel cell modules such that said coolant flowing out of said coolant outlet of one of said fuel cell modules flows into said coolant inlet of the next fuel cell module of said fuel cell modules.

2. A fuel cell stack according to claim 1, wherein said reactant gas passage includes a reactant gas flow groove for connection between said reactant gas inlet and said reactant gas outlet to supply said reactant gas to said anode or said cathode, and said coolant passage includes a coolant flow groove for connection between said coolant inlet and said coolant outlet to supply said coolant to said anode or said cathode.

3. A fuel cell stack according to claim 2, wherein said coolant inlet and said coolant outlet of one of said two fuel cell modules are positioned oppositely to said coolant inlet and said coolant outlet of the other of said two fuel cell modules.

4. A fuel cell stack according to claim 3, wherein said intermediate plate has a flow passage for connecting said reactant gas outlet of one of said two fuel cell modules to said reactant gas inlet of the other of said two fuel cell modules.

5. A fuel cell stack according to claim 4, wherein said intermediate plate has an inlet connected to said flow passage for supplying an additional reactant gas to said flow passage.

* * * * *